(12) United States Patent
Pietraszkiewicz et al.

(10) Patent No.: US 8,123,466 B2
(45) Date of Patent: Feb. 28, 2012

(54) BLADE OUTER AIR SEAL

(75) Inventors: Edward F. Pietraszkiewicz, Southington, CT (US); John C. Calderbank, Glastonbury, CT (US); Joseph A. Peto, Newmarket, NH (US); Lisa P. O'Neill, Manchester, CT (US); Michael J. Bruskotter, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 1094 days.

(21) Appl. No.: 11/712,863

(22) Filed: Mar. 1, 2007

(65) Prior Publication Data
US 2008/0211192 A1 Sep. 4, 2008

(51) Int. Cl.
*F01D 11/08* (2006.01)
(52) U.S. Cl. ...................................... 415/116; 415/173.7
(58) Field of Classification Search ............... 415/173.1, 415/116, 173.4, 174.4, 213.1
See application file for complete search history.

(56) References Cited

U.S. PATENT DOCUMENTS

| | | | | |
|---|---|---|---|---|
| 3,583,824 A * | 6/1971 | Smuland et al. | ............... | 415/117 |
| 3,603,599 A * | 9/1971 | Laird | ............................. | 277/414 |
| 4,017,207 A * | 4/1977 | Bell et al. | ...................... | 415/115 |
| 4,135,851 A * | 1/1979 | Bill et al. | .................... | 415/173.3 |
| 4,303,371 A * | 12/1981 | Eckert | ........................... | 415/116 |
| 4,642,024 A * | 2/1987 | Weidner | ........................ | 415/116 |
| 5,165,847 A * | 11/1992 | Proctor et al. | ................. | 415/115 |
| 5,399,066 A * | 3/1995 | Ritchie et al. | ................. | 415/115 |
| 5,480,281 A * | 1/1996 | Correia | ......................... | 415/115 |
| 5,609,469 A | 3/1997 | Worley et al. | | |
| 6,126,389 A * | 10/2000 | Burdgick | ...................... | 415/115 |
| 6,139,257 A * | 10/2000 | Proctor et al. | ................. | 415/115 |
| 6,331,096 B1 * | 12/2001 | Burdgick et al. | ................ | 415/115 |
| 6,354,795 B1 * | 3/2002 | White et al. | .................. | 415/116 |
| 6,393,331 B1 | 5/2002 | Chetta et al. | | |
| 6,877,952 B2 * | 4/2005 | Wilson | ......................... | 415/136 |
| 7,033,138 B2 * | 4/2006 | Tomita et al. | ................. | 415/139 |
| 7,114,914 B2 * | 10/2006 | Gendraud et al. | ............ | 415/108 |
| 7,210,899 B2 * | 5/2007 | Wilson, Jr. | ................. | 415/173.1 |
| 7,517,189 B2 * | 4/2009 | Camus | ....................... | 415/173.1 |
| 2004/0071548 A1 * | 4/2004 | Wilson, Jr. | ................. | 415/173.1 |
| 2006/0140753 A1 * | 6/2006 | Romanov et al. | .......... | 415/173.1 |
| 2007/0041827 A1 * | 2/2007 | Camus | .......................... | 415/116 |
| 2009/0067994 A1 * | 3/2009 | Pietraszkiewicz et al. | | 415/173.1 |

* cited by examiner

*Primary Examiner* — Nathaniel Wiehe
*Assistant Examiner* — Aaron R Eastman
(74) *Attorney, Agent, or Firm* — Bachman & LaPointe, P.C.

(57) ABSTRACT

A turbine engine blade outer air seal segment has a body having a base portion. The base portion has a transversely concave ID face, a forward end, an aft end, and first and second circumferential edges. The body has at least one mounting hook. At least one cover plate is secured to the body to define at least one cavity. The cover plate has a plurality of feed holes. A plurality of outlet holes extend through the base portion to the ID face. At least one of the base portion and cover plate comprises a protruding portion protruding into the cavity to form a partial restriction separating circumferentially and fore-aft offset cavity portions.

17 Claims, 5 Drawing Sheets

BLADE OUTER AIR SEAL

BACKGROUND

The disclosure relates to gas turbine engines. More particularly, the disclosure relates to casting of cooled shrouds or blade outer air seals (BOAS).

BOAS segments may be internally cooled by bleed air. For example, cooling air may be fed into a plenum at the outboard or outside diameter (OD) side of the BOAS. The cooling air may pass through passageways in the seal body and exit outlet ports in the inboard or inner diameter (ID) side of the body (e.g. to film cool the ID face). Air may also exit along the circumferential ends (matefaces) of the BOAS so as to be vented into the adjacent inter-segment region (e.g., to help cool feather seal segments sealing the adjacent BOAS segments).

An exemplary BOAS configuration includes a casting and an OD cover plate welded to the casting. Air passes from the plenum through holes in the cover plate and into one or more feed chambers/cavities in the BOAS from which the passageways extend. An exemplary BOAS is found in U.S. Pat. No. 6,393,331.

SUMMARY

One aspect of the disclosure involves a turbine engine blade outer air seal segment having a body having a base portion. The base portion has a transversely concave ID face, a forward end, an aft end, and first and second circumferential edges. The body has at least one mounting hook. At least one cover plate is secured to the body to define at least one cavity. The cover plate has a plurality of feed holes. A plurality of outlet holes extend through the base portion to the ID face. At least one of the base portion and cover plate comprises a protruding portion protruding into the cavity to form a partial restriction separating circumferentially and fore-aft offset cavity portions.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
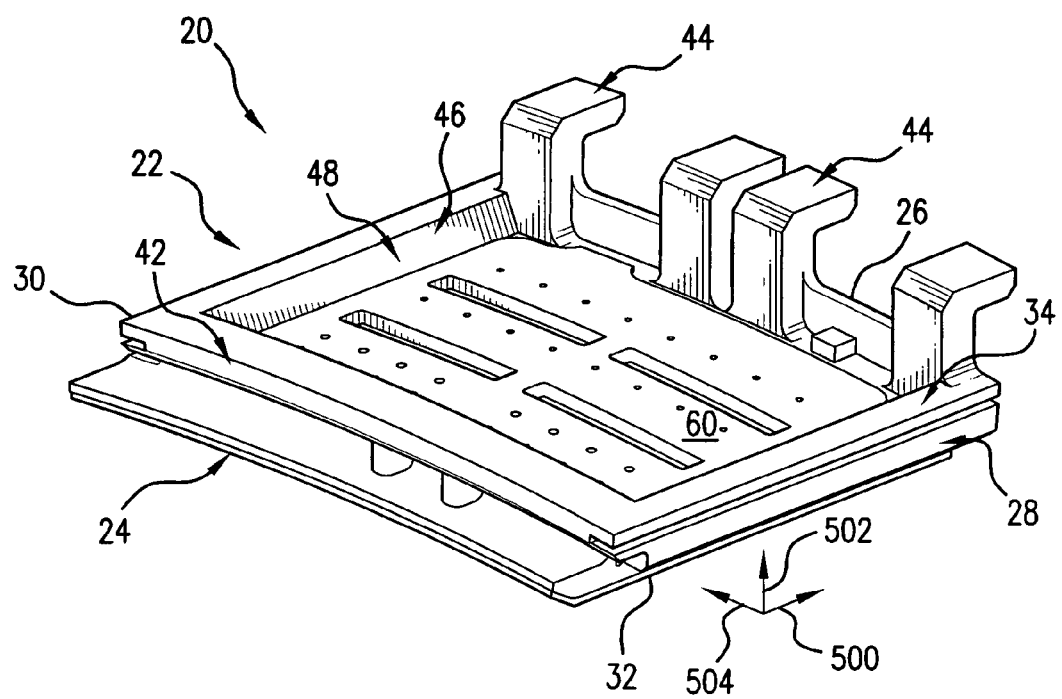
FIG. 1 is an isometric view of a blade outer airseal (BOAS).

FIG. 1 shows blade outer air seal (BOAS) 20. The BOAS has a main body portion 22 having a leading/upstream/forward end 24 and a trailing/downstream/aft end 26. FIG. 1 further shows an approximate longitudinal/overall-downstream/aftward direction 500, an approximate radial outward direction 502, and an approximate circumferential direction 504. The body has first and second circumferential ends or matefaces 28 and 30. The body has an inner diameter (ID)/inboard face 32 and an outer diameter (OD)/outboard face 34.

To mount the BOAS to environmental structure 40 (FIG. 3), the exemplary BOAS has a plurality of mounting hooks. The exemplary BOAS has a single forward mounting hook 42 having a forwardly-projecting distal portion recessed aft of the forward end 24. The exemplary BOAS has a series of four aft hooks 44 each having a rearwardly-projecting distal portion protruding beyond the aft end 26.

Figure 3:
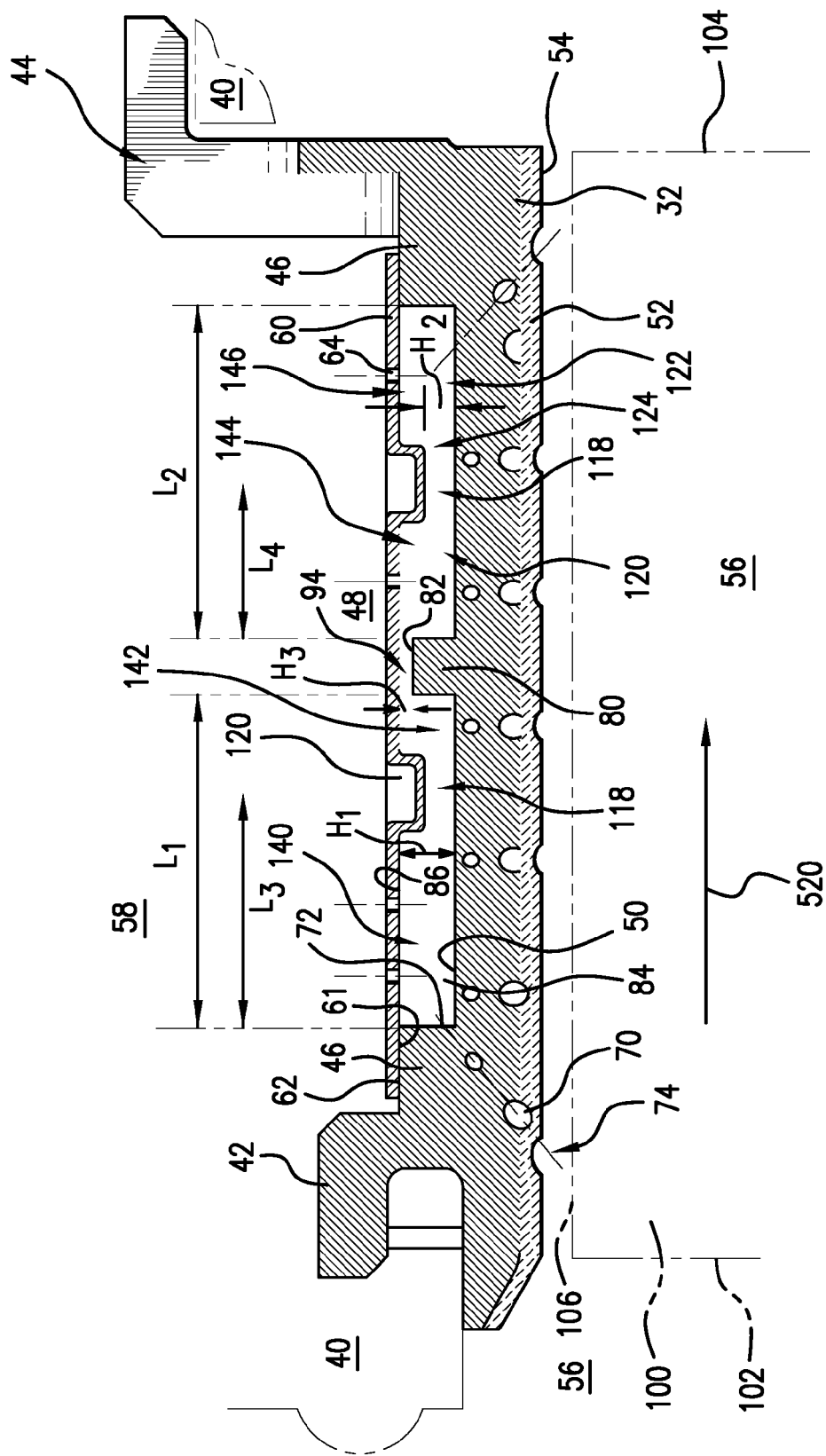
FIG. 3 is a longitudinal sectional view of the BOAS of FIG. 2 taken along line 3-3.

The BOAS has a wall structure 46 circumscribing/surrounding a recess/cavity 48 described in further detail below. The exemplary distal portion of the forward hook 42 is formed as a full width lip extending from a front segment of the wall 46 (FIG. 3). The exemplary proximal portions of the aft hooks 44 extend upward from an aft segment of the wall 46. A floor or base 50 of the chamber is locally formed by a central portion of the OD face 34. The ID face may bear a thermal barrier coating 52 having an exposed surface 54.

A circumferential ring array of a plurality of the BOAS 20 may encircle an associated blade stage of a gas turbine engine. The assembled ID faces 32/coating surfaces 54 thus locally bound an outboard extreme of the core flowpath 56 (FIG. 3). The BOAS 20 may have features for interlocking the array. The exemplary matefaces 28 and 30 have complementary shiplap features. Other implementations may include slots (not shown) for accommodating edges of seals spanning junctions between adjacent BOAS 20 or may include finger joints.

The BOAS may be air-cooled. For example, bleed air may be directed to a chamber 58 (FIG. 3) immediately outboard of a baffle plate 60 that extends across the chamber 48. A perimeter portion of the underside/ID surface 61 of the baffle plate 60 may sit atop and be welded or brazed to a shoulder surface 62 of the wall 46. The bleed air may be directed through impingement feed holes 64 in the plate 60 to the inboard portion of the chamber 48. Air may exit the chamber 48 through discharge passageways 70. Exemplary passageways 70 extend from inlets 72 at the chamber 48 to outlets 74 along the TBC 52.

Figure 2:
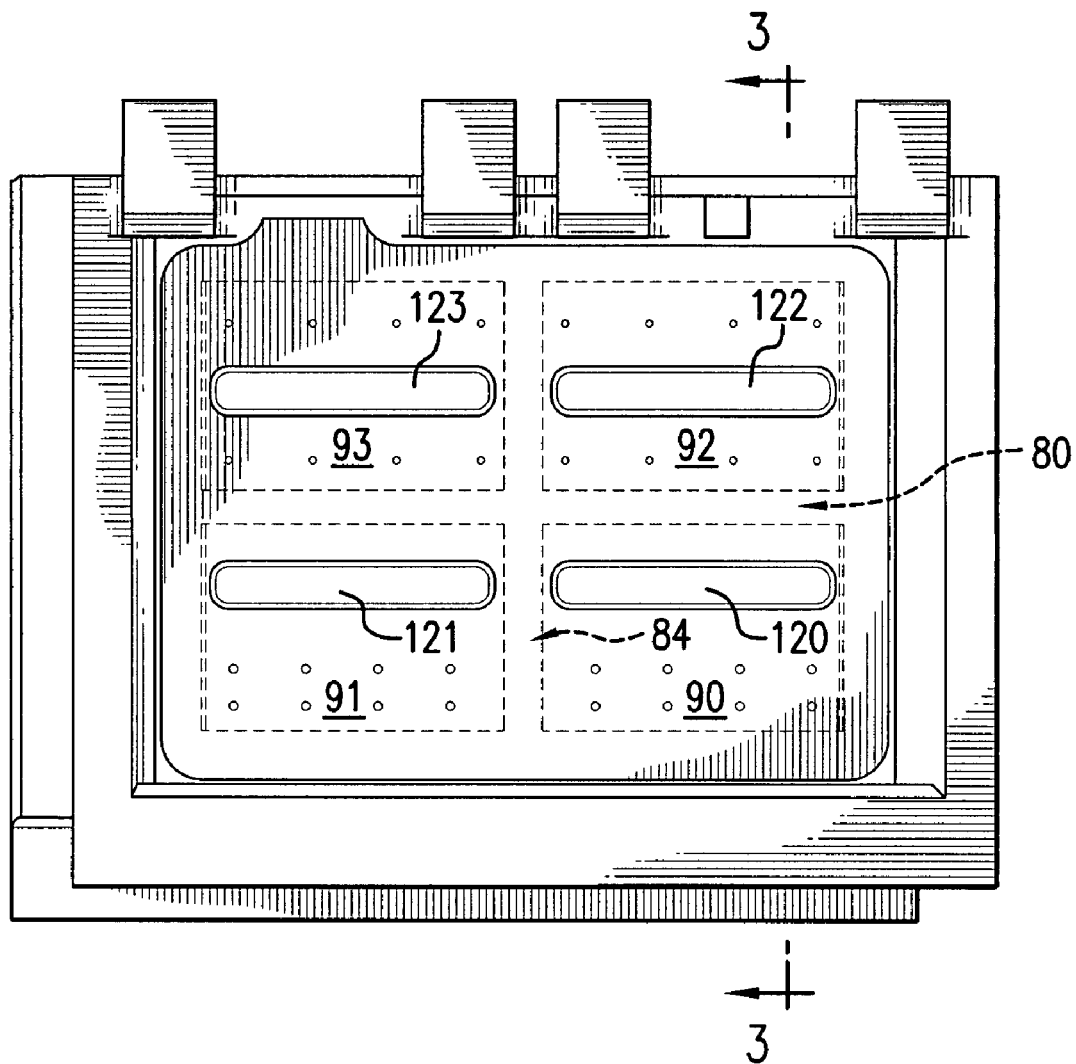
FIG. 2 is an OD/top view of the BOAS of FIG. 1.

The exemplary casting includes a circumferential rib 80 in the chamber 48. The exemplary rib 80 is partial shoulder height so that its outboard surface 82 (FIG. 3) is recessed below the underside 61 of the plate 60. The exemplary casting further includes an axial/longitudinal rib 84 in the chamber 48. The exemplary rib 84 is full shoulder height so that its outboard surface 86 may contact the underside 61 of the plate 60 (e.g., and be secured thereto as the plate is secured to the shoulder surface 62). The ribs divide the portion of the chamber 48 below the plate 60 into four quadrant (sub)chambers/cavities 90, 91, 92, and 93 (FIG. 2). A gap 94 is formed between the surface 82 and the plate underside 61 on each side of the axial rib 84. For purposes of description, reference to a single circumferential rib 80 having portions on each side of the axial rib 84 is equivalent to referencing one circumferential rib extending from the first side of the axial rib and a second circumferential rib extending from the second side of the axial rib.

FIG. 3 schematically shows a blade 100 of the associated stage. The blade has an airfoil with a leading edge 102, a trailing edge 104, and a tip 106. Action of the airfoil imposes a pressure gradient to the airflow 520 passing downstream along the surface 54. For example, the gradient may provide an exemplary 50% drop in pressure from a leading group of the outlets 74 to a trailing group of the outlets 74. This pressure difference may pose difficulties in cooling the BOAS. In particular, feeding from a common chamber 48 may end up providing one or both of excessive flow through the trailing holes and insufficient flow through the leading holes. To address this, the prior art has tailored the distribution of feed air to fully isolated fore and aft chambers. Nevertheless, there remain such flow problems within either of the two chambers.

To address this problem, the quadrant chambers 90-93 may each be divided into separate upstream (fore) and downstream (aft) regions, respectively. The division may be only partial, with an open restricted region 118 separating upstream and downstream regions from each other. Each exemplary restriction is formed by a channel 120, 121, 122, and 123 in the baffle plate 60 projecting as a blister toward the floor 50. The exemplary channels are essentially full width of the associated half of the chamber 48 and provide the restricted region 124 with a height $H_2$ approximately 30-60% of a height $H_1$ of remaining majority portions of the chamber. Exemplary heights are essentially uniform, but may also represent other characteristic heights (e.g., mean, modal, or median). An exemplary height $H_3$ of the gap 94 is less than 60% of $H_1$, more narrowly less than 40% or 5-30%.

The centers of the exemplary channels 120 and 121 are in the downstream halves of their associated quadrant chambers 90 and 91. The centers of the exemplary channels 122 and 123 are in the upstream halves of their associated quadrant chambers 92 and 93. The exemplary chambers 90/91 and 92/93 respectively have lengths $L_1$ and $L_2$. The center of the exemplary channels 120/121 and 122/123 are respectively at lengths $L_3$ and $L_4$ downstream of the downstream faces of the forward leg of the wall 46 and wall/rib 80.

In an exemplary model of a steady state operating condition, an exemplary pressure in the flowpath 56 at the leading group of outlets 74 is an exemplary 300-400 psia whereas the pressure at a trailing/downstream group is about 50-75% of that. Four upstream-to-downstream groups of holes 70 are fed from the cavities 90 and 91. An exemplary pressure at the outlets 74 of the downstreammost of these four is proportionately less than at the leading group. The size/number/distribution of holes along the cavity 90 may be selected to provide a pressure in the cavity 90 above that of the leading group of holes (e.g., 5-15% above or about 20-40 psi above).

Four upstream-to-downstream groups of holes 70 are fed from the cavities 92 and 93. An exemplary pressure at the outlets 74 of the upstreammost of these four is proportionately above that of the trailing group. The heights $H_2$ and $H_3$ are selected to be sufficiently small to permit an effective pressure difference between the four distinct upstream to downstream regions 140, 142, 144, and 146. The pressure difference allows each of the regions to be maintained at an associated pressure above (e.g., 5-15% above) that of their highest pressure outlets 74. The positions of the channels may be selected to apportion the holes 70 between the regions in such a way as to minimize total air requirements for a given cooling level.

Zero values of $H_2$ and/or $H_3$ might interfere with local cooling and might permit rubbing between the plate and body. Thus a higher value may be preferred. Plate hole diameter for holes 64 (if any) along the channel and the quantity/distribution of such holes may be chosen in combination with $H_2$ to provide desired local impingement cooling. The quantities of the holes 64 along each region 140, 142, 144, and 146 may be chosen to maintain the desired pressures in those regions.

Additional variations (not shown) include circumferential asymmetries in the distribution of the ribs, channels or holes in the plate or casting.

Figure 4:
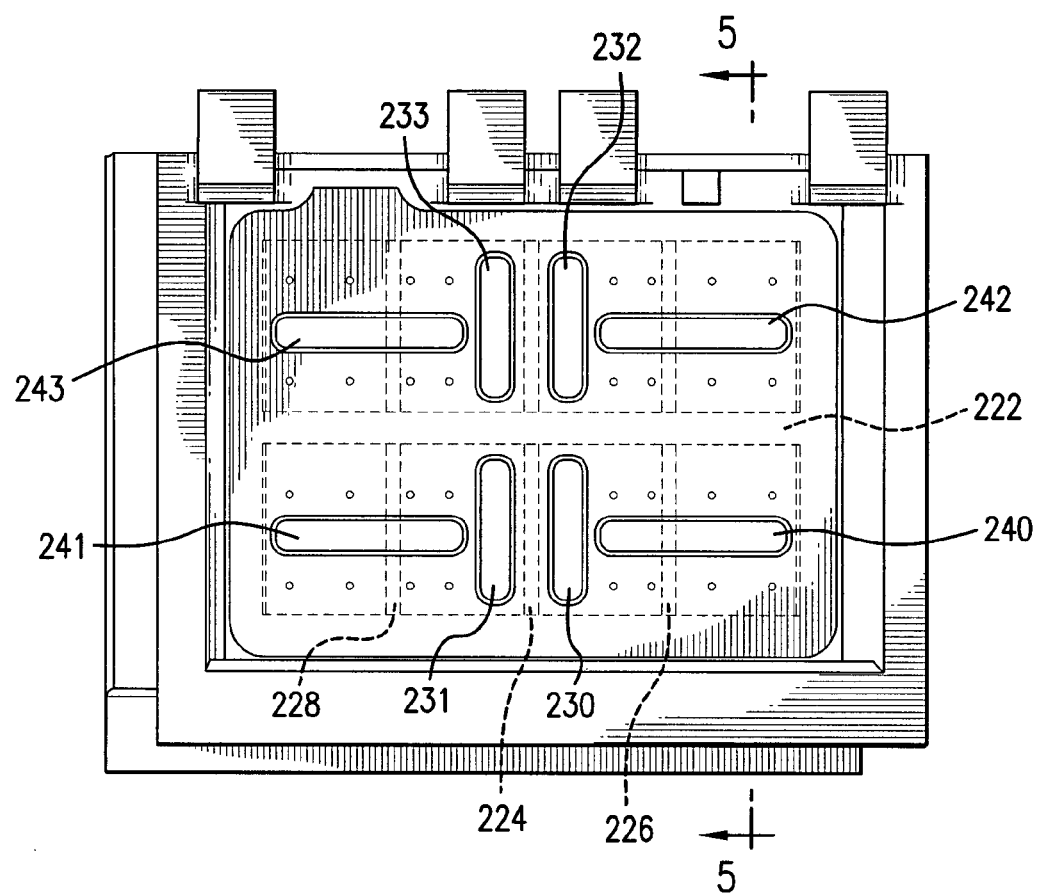
FIG. 4 is an OD/top view of an alternate BOAS.
Figure 5:
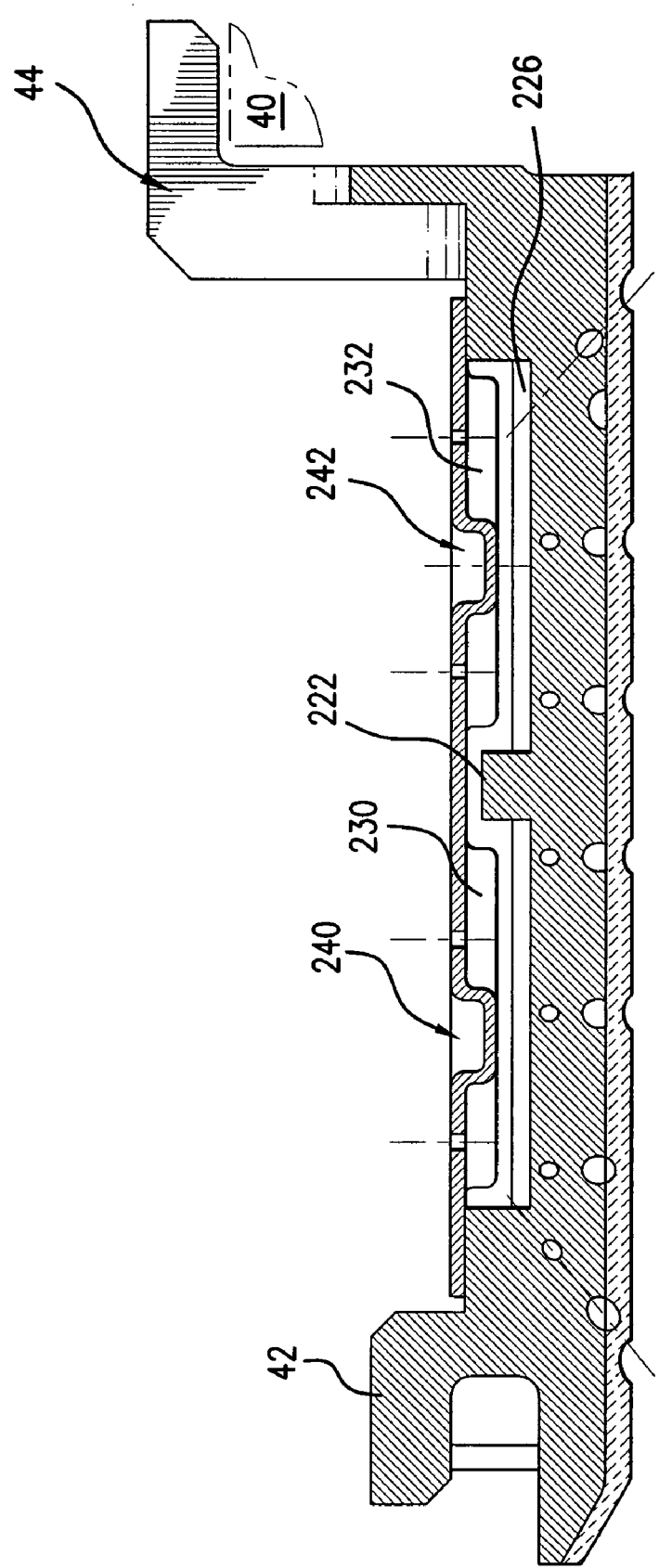
FIG. 5 is a longitudinal sectional view of the BOAS of FIG. 4, taken along line 5-5.

FIGS. 4 and 5 show an alternative BOAS 220 otherwise similar but wherein a central circumferential rib 222 is full height and a central axial rib 224 is partial height. Each resulting chamber quadrant may be further divided in half by one of first and second partial height axial ribs 226 and 228.

To further restrict circumferential flow between adjacent quadrant chambers, along each quadrant, the cover plate may include an axial elongate channel 230, 231, 232, and 233 spaced just aside the axial rib 224. Circumferentially elongate channels 240, 241, 242, and 243 may be similarly positioned to the channels 120-123, respectively but foreshortened at their inboard ends to accommodate the associated channel 230-233.

The BOAS may be formed as a reengineering of a baseline BOAS configuration. In one reengineering example, the original casting has a full-height circumferential rib and no axial ribs. The cover plate is a flat (technically arcuate at the local engine radius) and unchanneled. The engineering may preserve the basic shape of the casting and plate while making the identified changes regarding ribs and channels and associated optimization in whole distribution in the casting and plate. Alternative or further refinements may be made preserving casting geometry (i.e., rib location and size) while altering channel geometry. Other variations may involve shifting of existing ribs. With stamped channels, varying channel geometry may be much easier and less expensive than varying casting geometry.

The reengineering may also shift the distribution of the holes 64. An exemplary shift is an overall forward shift (e.g., measured as a mean or other average). An exemplary shift combined with rib and/or channel addition or modification may reduce the total cooling air flow by increasing the overall restriction provided by the plate and casting combination.

One or more embodiments have been described. Nevertheless, it will be understood that various modifications may be made without departing from the spirit and scope of the invention. For example, when implemented in the reengineering of a baseline BOAS, or using existing manufacturing techniques and equipment, details of the baseline BOAS or existing techniques or equipment may influence details of any particular implementation. Accordingly, other embodiments are within the scope of the following claims.

What is claimed is:

1. A method for manufacturing a turbine engine blade outer air seal segment, the method including a reengineering from a baseline configuration and the segment comprising:
   a body having:
      a base portion having:
         a transversely concave ID face;
         a plurality of outlet holes extending through the base portion to the ID face;
         a forward end;
         an aft end; and
         first and second circumferential edges; and
      at least one mounting hook; and
   at least one cover plate secured to the body to define at least one cavity and having a plurality of feed holes through the cover plate,
   wherein:
      at least one of the base portion and cover plate comprises at least one protruding portion protruding into the cavity to form at least partial restrictions separating circumferentially and fore-aft offset compartment portions; and
      at least some of the feed holes are upstream of a given one of the at least one protruding portion and at least some of the feed holes are downstream of said given one of the at least one protruding portion,
   the method comprising;
      determining an indication of an operational core flow pressure drop along the ID face;

selecting a characteristics of the protruding portion to provide a fore-aft pressure drop within the cavity, wherein a distribution of the feed holes in the plate is shifted forward relative to the baseline configuration;
manufacturing the protruding portion with said characteristic via stamping;
manufacturing the body via casting; and
securing the cover plate to the body.

2. The segment of claim 1 further comprising:
a coating on the base portion ID face.

3. The apparatus of claim 1 wherein:
the at least one mounting hook includes:
at least one front mounting hook; and
at least one aft mounting hook.

4. The apparatus of claim 1 wherein the at least one protruding portion comprises:
at least one blister on the cover plate.

5. The segment of claim 4 further comprising:
a coating on the base portion ID face.

6. The apparatus of claim 1 wherein:
the cover plate is a stamping;
the body is a casting having a thermal barrier coating on the ID face; and
the cover plate is welded to the body.

7. A turbine engine blade outer air seal segment comprising:
a body having:
a base portion having:
a transversely concave ID face;
a forward end;
an aft end; and
first and second circumferential edges; and
at least one mounting hook; and
at least one cover plate secured to the body to define at least one cavity and having a plurality of feed holes, a plurality of outlet holes extending through the base portion to the ID face,
wherein:
at least one of the base portion and cover plate comprises at least one protruding portion protruding into the cavity to form at least partial restrictions separating circumferentially and fore-aft offset compartment portions; and
the at least one protruding portion comprises:
an essentially full height axial rib of the body;
a partial height circumferential rib of the body, the axial rib and circumferential rib cooperating to divide the compartment into four quadrants; and
four circumferentially elongate blisters on the cover plate, each along a respective one of the four quadrants.

8. The apparatus of claim 7 wherein the at least one protruding portion consists essentially of:
said axial rib;
said circumferential rib; and
said four circumferentially elongate blisters.

9. A turbine engine blade outer air seal segment comprising:
a body having:
a base portion having:
a transversely concave ID face;
a forward end;
an aft end; and
first and second circumferential edges; and
at least one mounting hook; and
at least one cover plate secured to the body to define at least one cavity and having a plurality of feed holes, a plurality of outlet holes extending through the base portion to the ID face,
wherein:
at least one of the base portion and cover plate comprises at least one protruding portion protruding into the cavity to form at least partial restrictions separating circumferentially and fore-aft offset compartment portions; and
the at least one protruding portion comprises:
a partial height axial rib of the body
an essentially full height circumferential rib of the body, the axial rib and circumferential rib cooperating to divide the compartment into four quadrants;
four circumferentially elongate blisters on the cover plate, each along a respective one of the four quadrants; and
four axially elongate blisters on the cover plate, each along a respective one of the four quadrants.

10. The apparatus of claim 9 wherein:
each of said four axially elongate blisters is positioned between said axial rib and an associated one of the circumferentially elongate blisters.

11. The apparatus of claim 9 wherein the axial rib is a first axial rib and the at least one protruding portion further comprises:
a second partial height axial rib on a first side of the first axial rib; and
a third partial height axial rib on a first side of the first axial rib.

12. The apparatus of claim 11 wherein the at least one protruding portion consists essentially of:
said first, second, and third axial ribs;
said circumferential rib;
said four circumferentially elongate blisters; and
said four axially elongate blisters.

13. A method for manufacturing a turbine engine blade outer air seal segment, the method including a reengineering from a baseline configuration and the segment comprising:
a body having:
a base portion having:
a transversely concave ID face;
a forward end;
an aft end; and
first and second circumferential edges; and
at least one mounting hook; and
at least one cover plate secured to the body to define at least one cavity and having a plurality of feed holes, a plurality of outlet holes extending through the base portion to the ID face, wherein:
at least one of the base portion and cover plate comprises means for providing an operational axial/circumferential pressure gradient within the cavity to compensate for an operational core flow pressure drop along the ID face,
the method comprising;
determining an indication of an operational core flow pressure drop along the ID face;
selecting a characteristic of the protruding portion to provide a fore-aft pressure drop within the cavity, wherein a distribution of the feed holes in the plate is shifted forward relative to the baseline configuration;
manufacturing the protruding portion with said characteristic via stamping;
manufacturing the body via casting; and
securing the cover plate to the body.

14. The segment of claim 13 wherein:
the means comprises a constriction of the cavity; and at least some of the feed holes are upstream of the at least one constriction and at least some of the feed holes are downstream of the at least one constriction.

15. A method for manufacturing a turbine engine blade outer air seal segment including reengineering a configuration of a turbine engine blade outer air seal segment from a baseline configuration to a reengineered configuration, the baseline configuration comprising:
a body having:
a base portion having:
a transversely concave ID face; a forward end; an aft end; and
first and second circumferential edges; and
at least one mounting hook; and
at least one cover plate secured to the body to define at least one impingement cavity and having a plurality of feed holes, a plurality of outlet holes extending through the base portion to the ID face, the method comprising:
determining an indication of an operational core flow pressure drop along the ID face;
selecting a characteristic of the protruding portion to provide a fore-aft pressure drop with the cavity;
adding a protrusion into the cavity from at least one of the cover plate and base portion in the reengineering;
manufacturing the at least one of the cover plate and base portion with the protrusion;
and
securing the at least one of the cover plate and base portion to the other of the cover plate and base portion, wherein:
the baseline configuration has a mean location of the feed holes; and the reengineered configuration has a mean location of the feed holes forward of the baseline configuration mean location.

16. The method of claim 15 wherein:
the protrusion comprises a blister; and
at least some of the feed holes are upstream of the at least one protrusion and at least some of the feed holes are downstream of the at least one protrusion.

17. The method of claim 15 wherein:
relative to the baseline configuration, the reengineered configuration has a reduced cooling air requirement for a given level of cooling.

* * * * *